Sept. 8, 1959 K. H. BARNEY ET AL 2,903,605

EXTENDED GATE GENERATING CIRCUIT

Filed Nov. 7, 1955 2 Sheets-Sheet 1

INVENTOR
KAY H. BARNEY
LAWRENCE GREENSPAN
BY R. V. Craddock
ATTORNEY

INVENTORS
KAY H. BARNEY
LAWRENCE GREENSPAN
BY
ATTORNEY 2,903,605

EXTENDED GATE GENERATING CIRCUIT

Kay H. Barney, Roslyn Heights, N.Y., and Lawrence Greenspan, San Diego, Calif., assignors to Sperry Rand Corporation, a corporation of Delaware Application November 7, 1955, Serial No. 545,292

5 Claims. (Cl. 307—88.5)

This invention relates to pulse timing systems, and more particularly, is concerned with providing a circuit generating a gating voltage continuing for a predetermined time delay period following the last of a succession of input pulses.

In radar and other types of electronic circuits, it is sometimes desirable to provide a timing system for generating a D.C. output voltage, or a gating voltage as it is frequently described, of a certain magnitude and time duration in response to an input trigger pulse. It may be further desirable that the timing system be automatically resettable by further trigger pulses received before termination of the gating voltage, so as to extend the gating voltage for a further period of time from the last of the received trigger pulses.

It is the general object of this invention to provide an improved timing circuit for generating a gating voltage in response to an input trigger pulse, the gating voltage extending for a time period of desired length after the last received input trigger pulse of a series of input pulses.

Another object of this invention is the provision of such extended gate generating means in which the length of time after the last received of such input pulses is relatively, long, for example, of the order of ten or fifteen seconds.

It is another object of this invention to achieve extended time delay intervals of ten or fifteen seconds with low impedance timing circuits, rather than high impedance timing circuits, the latter being more sensitive to changes in the ambient operating conditions.

It is another object of this invention to provide an extended time delay circuit which may be readily transistorized.

These and other objects of the invention which will become apparent as the description proceeds are achieved by a circuit including a first bistable multivibrator for producing the desired gating voltage, the multivibrator being triggered on by a received triggering input pulse. A source of set and reset pulses, which are alternately generated, is provided, the set pulses being coupled to a bistable multivibrator for opening a gate. The reset pulses are connected through this open gate to the first multivibrator for triggering off the first multivibrator and terminating the gating voltage. The second multivibrator is triggered by the input trigger pulses to close the gate. Then if an input pulse is received before a reset pulse is generated, the gate is closed again, preventing the reset pulse from triggering off the first multivibrator.

For a better understanding of the invention, reference should be had to the accompanying drawing, wherein.

Figures 1, 2:
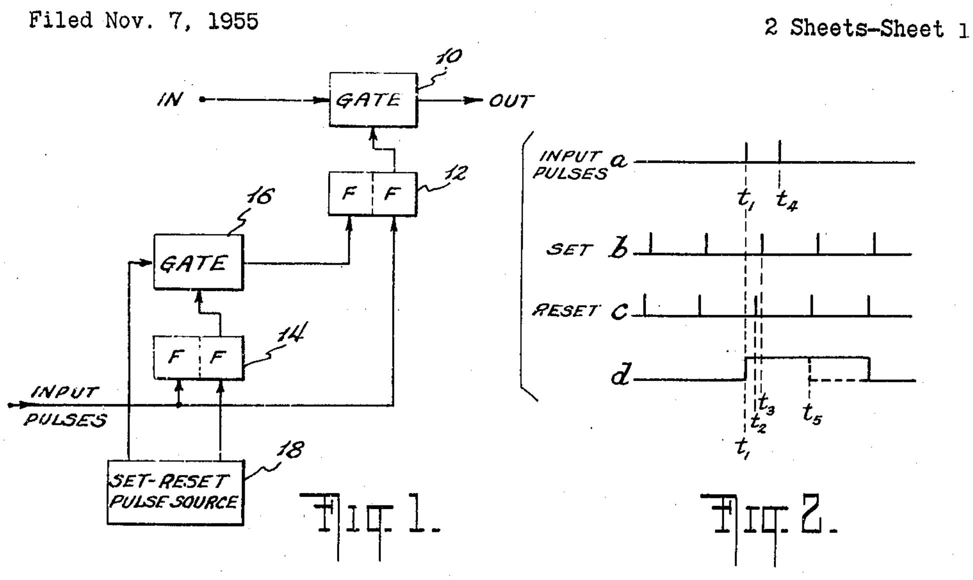
Fig. 1 is a block diagram of the extended gate circuit.
Fig. 2 is a plot of various wave forms as a function of time for the circuit of Fig. 1.

Referring to Fig. 1, the numeral 10 indicates generally a gate or And circuit. The gate circuit 10 is of conventional design and operates in the manner of a switch which is opened or closed by a gating voltage derived from a flip-flop or bistable multivibrator circuit 12. The gate 10 may be used to couple any input circuit to a suitable output circuit (neither of which is shown) as may be required. The flip-flop circuit 12 is triggered to one of its bistable states by an input trigger pulse derived from a source of input pulses, as for example, the video pulses from a radar receiver. The input pulses may have any repetition rate within the usual range of pulse repetition rates employed in radar systems. The input pulse wave form is shown in Fig. 2*a*. The first input pulse received triggers the flip-flop 12 on and opens the gate 10. Subsequent input pulses of course have no effect on the flip-flop circuit 12 once the gate 10 is open.

The input trigger pulses are also coupled to a second flip-flop circuit 14 which controls a second gate circuit 16. The flip-flop 14 is arranged to bias the gate 16 off when triggered by an input trigger pulse.

The flip-flop 14 is triggered on to open the gate 16 by pulses received from a set-reset pulse source 18. The pulse source 18 is designed to provide two sets of outputs, one of which is a train of set pulses, as shown in Fig. 2*b*, and a train of reset pulses as shown in Fig. 2*c*. The reset pulses occur slightly less than a full period later than the set pulses, both trains of pulses having the same repetition rate.

The set pulses from the source 18 are coupled to the flip-flop 14, actuating the flip-flop 14 to open the gate 16. With the gate 16 open, reset pulses derived from the source 18 are passed by the gate 16 to the flip-flop 12. The reset pulses are arranged to actuate the flip-flop 12 to close the gate 10. Thus the gate 10 cannot be closed following an input trigger pulse until a set pulse and a reset pulse have been generated in that order by the pulse source 18.

The operation of the circuits thus far described can be understood by considering the time relation of the pulse wave forms of Fig. 2. On receiving of the first video pulses occurring at $t_1$ in Fig. 2*a*, the flip-flop 12 is triggered on, providing a gating output voltage, the wave form of which is shown in Fig. 2*d*. Following the first input pulse at $t_1$, there next occurs a reset pulse at $t_2$. The reset pulse finds the gate 16 closed by the first input pulse. Next follows a set pulse at $t_3$ which triggers the flip-flop 14 on and opens the gate 16. If no further video pulses were received, the next reset pulse occurring at $t_5$ would be passed by the gate 16 to flip-flop 12, triggering the flip-flop 12 off and closing the gate 10. The resulting gating voltage, shown by Fig. 2*d*, would correspond to the dotted line. However, if a second video pulse is received at $t_4$ before the next reset pulse occurs at $t_5$, the flip-flop 14 is triggered off and the gate 16 closed. Thus the reset pulse occurring at $t_5$ is blocked and the gate 10 remains open until the next successive set pulse can open the gate 16 and the following reset pulse can trigger the flip-flop 12 to close the gate 10. The resulting gating voltage applied to the gate 10 is shown by the solid line of Fig. 2*d*. It will be seen that the duration of the gating voltage, shown in Fig. 2*d*, is independent of the input pulse repetition rate.

Figure 3:
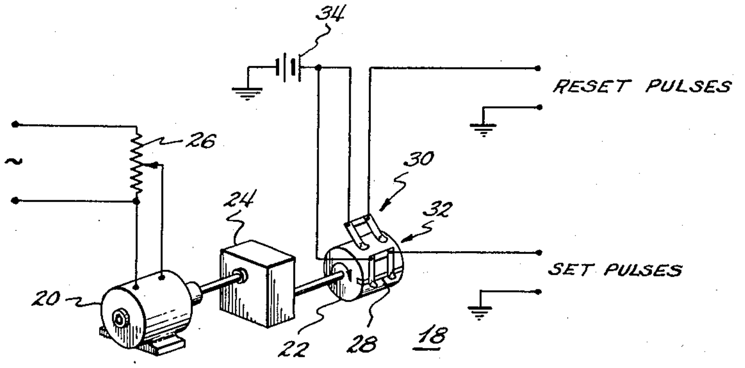
Fig. 3 shows a suitable pulse generator.

One suitable means for generating the set and reset pulses is shown in Fig. 3. A motor 20 drives a non-conductive drum 22 through a gear speed reducer 24. The speed of the motor 20 may be controlled from an A.-C. source by means of a variable autotransformer 26. The drum 22 made of dielectric material, is provided with an axially extending shorting bar 28. Two sets of wiper contacts, indicated generally at 30 and 32, are successively shorted by the shorting bar 28 as it rotates with the drum. Each pair of contacts, when shorted, momentarily connects a battery 34 to the set pulse output and reset pulse output respectively, to produce the desired pulses. By properly adjusting the speed of the motor 20 and the amount of speed reduction produced by gear reducer 24, the pulse repetition rate can be controlled to any desired value. By appropriate spacing of the contact pairs 30 and 32, the relative phase between the set pulses and the reset pulses can be controlled. The speed of the drum is preferably adjusted to a period of 10 to 15 seconds, but this may be varied as required.

Figure 4:
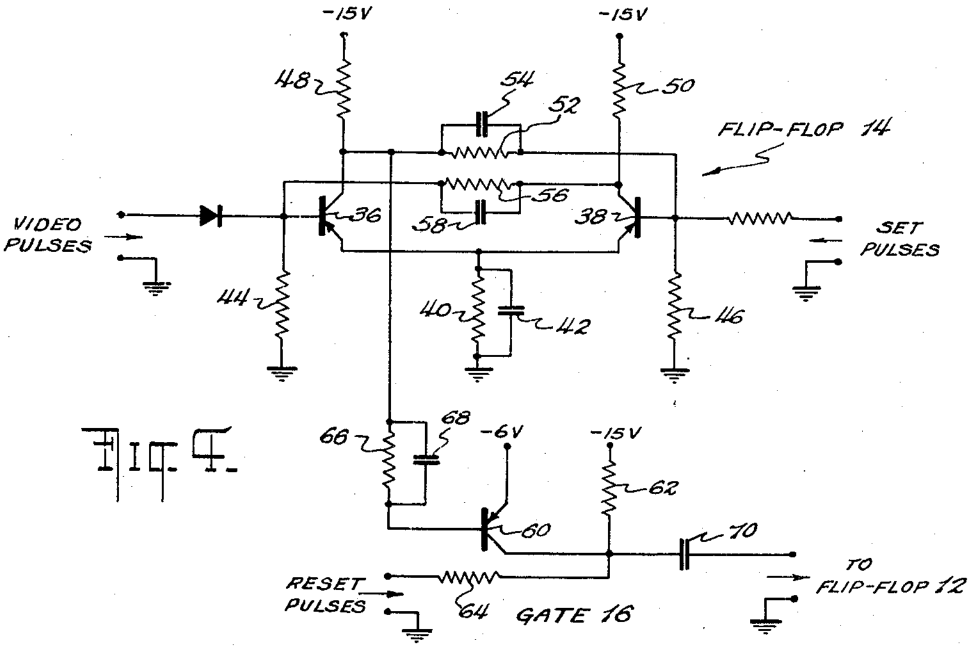
Fig. 4 shows a suitable transistorized flip-flop circuit and associated gate.

While well known electronic type flip-flop and gate circuits may be utilized, transistorized flip-flop and gate circuits as shown in Fig. 4 are preferred. The flip-flop circuit comprises a pair of transistors 36 and 38, which are preferably of a pnp junction type having the emitter electrodes thereof connected to ground through a common resistor 40 and capacitor 42. Respective base electrodes of the transistors 36 and 38 are connected to ground by resistors 44 and 46 respectively. A negative voltage is applied to the respective collector electrodes of the transistors 36 and 38 through resistors 48 and 50. The collector of the transistor 36 is connected to the base of the transistor 38 through a resistor 52 and capacitor 54 in parallel, while the collector of the transistor 38 is connected to the base of the transistor 36 through a similar resistor 56 and capacitor 58 in parallel.

In operation, assuming initially that the transistor 36 is cut off and the transistor 38 is saturated, the voltage existing at the collector of the transistor 36 is nearly equal to the negative supply voltage. The coupling to the resistor 52 insures that the base of the transistor 38 is held sufficiently negative to produce saturation. As a result of the large current flow through the resistor 50, the collector of the transistor 38 is very close to ground potential. The potential at the base of the transistor 36, as a result of the voltage divider action of the resistors 44 and 56, is therefore smaller in magnitude by a few volts than the common emitter self bias voltage appearing across the resistor 40. The transistor 36 is therefore cut off.

When a positive set pulse, as derived from the pulse source 18, is applied across the resistor 46 to the base of the transistor 38, the current through the resistor 50 starts to decrease, making the collector of the transistor 38 more negative. This drop in voltage is coupled by the resistor 56 and capacitor 58 to the base of the transistor 36, driving the base of the transistor 36 more negative. As a result, the current through the resistor 48 in the collector circuit of the transistor 36 starts to increase as the collector of the transistor 36 begins to rise toward ground potential. The base of the transistor 38, by virtue of the coupling through resistor 52 and capacitor 54, also becomes less negative, resulting in a regenerative action which does not stabilize until the transistor 38 is cut off and the transistor 36 becomes saturated. The coupling capacitors 54 and 58 speed up this dynamic change, while the emitter bypass condenser 42 holds the emitters at a constant potential during the flip-over period.

The gate 16 as shown in Fig. 4 comprises a pnp type junction transistor having the collector electrode connected to a negative voltage source through a resistor 62. The collector electrode is also connected to the reset pulse output of the source 18 through a resistor 64. The base of the transistor is coupled through a resistor 66 and capacitor 68 to the collector electrode of transistor 36 of the flip-flop circuit 14. By connecting the emitter electrode of the transistor 60 to a proper potential which is positive with respect to the potential applied to the collector, changes in potential at the collector of the flip-flop transistor 36 cause the gate transistor 60 to be either saturated or cut off, depending upon the stable state of the flip-flop 14.

If the gate transistor 60 is saturated, it acts as a low impedance in shunt with the resistor 62, so that positive reset pulses cannot produce a change in potential at the collector electrode and consequently no pulses are coupled through the coupling capacitor 70. However, with the gating transistor 60 cut off, a positive going reset pulse produces a shift in the potential at the collector electrode of the transistor 60, resulting in a positive going pulse being coupled by the coupling capacitor 70.

Figure 5:
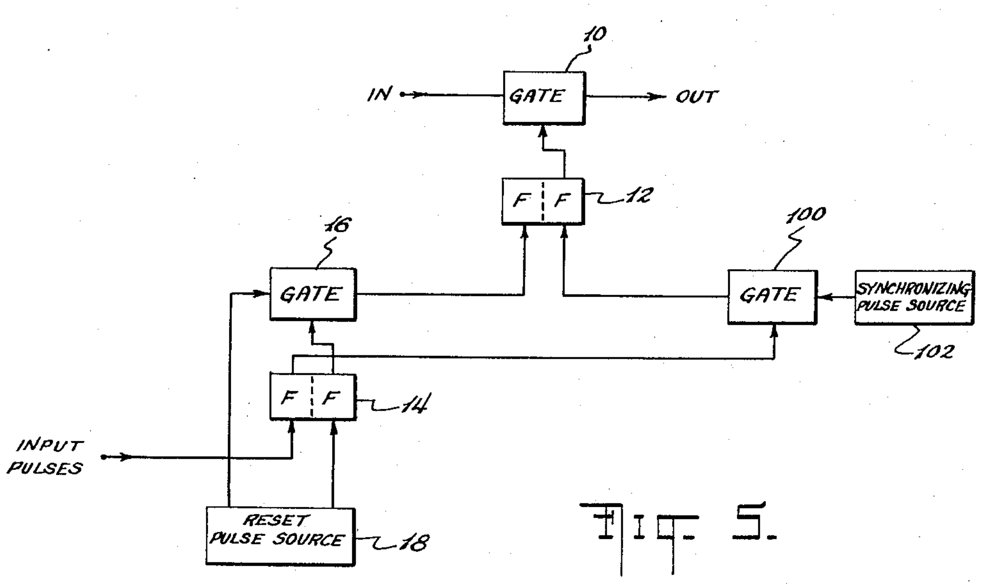
Fig. 5 shows a modification of the extended gate circuit.

The above described flip-flop and gate circuits are also suitable for use as the flip-flop 12 and gate 10 of Fig. 1. While transistor circuits have been described as preferred, it is to be understood that operation of the system is not dependent on use of these particular flip-flop and gate circuits, but can be made to operate equally as well with vacuum tube electronic circuits.

Where it is desired to synchronize the start of the gating voltage with external circuitry, the modification of Fig. 5 may be employed. This circuit is substantially the same as that of Fig. 1 except the input pulses, by means of the multivibrator 14, open a gate 100. A pulse derived from a suitable synchronizing pulse source 102 is then passed by the gate 100 to trigger the multivibrator 12 to initiate the start of the gating voltage. Generally the synchonizing pulse rate is much faster than the maximum rate of the input pulses. Thus the gating voltage from the multivibrator 12 is started in response to an input pulse but at a time synchronized with a synchronizing pulse from the source 102.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for gating open a circuit during reception of a series of input pulses and for a predetermined time following the last of the series, comprising first bistable means, a first source of pulses having a predetermined repetition rate coupled to the first bistable means for triggering the first bistable means to one of the stable states, the input pulses being coupled to the first bistable means for triggering the first bistable means to the other of the stable states, first gating means triggered open and closed by the first bistable means, a second source of pulses having the same predetermined repetition rate as the first source but out of phase therewith, second bistable means coupled to the second source by the first gating means, the second bistable means being triggered to one of its stable states in response to pulses from the second pulse source passed by the first gating means, the second bistable means being triggered by said input pulses to the other of its stable states, and second gating means triggered open and closed by the second bistable means.

2. Apparatus for gating open a circuit during reception of a series of input pulses and for a predetermined time following the last of the series, comprising first bistable means, a first source of pulses having a predetermined repetition rate coupled to the first bistable means for triggering the first bistable means to one of the stable states, the input pulses being coupled to the first bistable means for triggering the first bistable means to the other of the stable states, first gating means triggered open and closed by the first bistable means, a second source of pulses having the same predetermined repetition rate as the pulses from the first source but out of phase therewith, and second bistable means coupled to the second source by the first gating means, the second bistable means being triggered to one of its stable states in response to pulses from the second pulse source passed by the first gating means, the second bistable means being triggered by said input pulses to the other of its stable states.

3. Apparatus for generating a timed gating voltage in response to received input pulses, the apparatus comprising a first bistable multivibrator having an on condition and an off condition, the first multivibrator being triggered to its off condition by said input pulses, a second bistable multivibrator having an on condition and an off condition, means for triggering the second multivibrator to its on condition in response to said input pulses, means for generating a first series of pulses having a predetermined repetition rate, the first multivibrator being triggered to its on condition by pulses of said first series, a gate circuit opened and closed by the first multivibrator, the gate circuit being open when the first multivibrator is in its on condition, and means for generating a second series of pulses having the same repetition rate as the first series of pulses but displaced in time, the second series of pulses being coupled by the gate circuit to the second multivibrator, the second multivibrator being triggered to its off condition by the pulses of said second series.

4. Apparatus for generating a timed gating voltage in response to received input pulses, the apparatus comprising first bistable means having an on condition and an off condition, the first means being triggered to its off condition by said input pulses, second bistable means having an on condition and an off condition, means for triggering the second means to its on condition in response to said input pulses, means for generating a first series of pulses having a predetermined repetition rate, said first means being triggered to its on condition by pulses of said first series, switch means coupled to said first means, the switch means being open when said first means is in its off condition, and means for generating a second series of pulses having the same repetition rate as the first series of pulses but displaced in time, the second series of pulses being coupled by the switch means to said second means, said second means being triggered to its off condition by the pulses of said second series.

5. Apparatus as defined in claim 4 wherein said means for triggering the second bistable means includes a source of synchronizing pulses and gating means for coupling said source to said second bistable means, the gating means being biased open by said first bistable means in response to one of said input pulses.

References Cited in the file of this patent

UNITED STATES PATENTS

| | | |
|---|---|---|
| 2,536,917 | Dickinson | Jan. 2, 1951 |
| 2,723,080 | Curtis | Nov. 8, 1955 |